United States Patent [19]

Kaspar et al.

[11] 4,322,472

[45] Mar. 30, 1982

[54] ADHESIVE BASED ON A STARCH AND ACRYLAMIDE GRAFT COPOLYMER

[75] Inventors: Mark L. Kaspar, Oshkosh; James F. Lowey, Fremont, both of Wis.

[73] Assignee: Alco Standard Corporation, Valley Forge, Pa.

[21] Appl. No.: 201,289

[22] Filed: Oct. 27, 1980

Related U.S. Application Data

[63] Continuation-in-part of Ser. No. 103,596, Dec. 14, 1979, abandoned.

[51] Int. Cl.³ .............................................. B32B 27/00
[52] U.S. Cl. ................................. 428/350; 428/474.4; 428/532; 428/702; 524/846; 527/314
[58] Field of Search ............ 427/207.1; 260/17.4 GC; 428/350, 474.4, 702, 532

[56] References Cited

U.S. PATENT DOCUMENTS

| | | | |
|---|---|---|---|
| 3,407,084 | 10/1968 | Heywood | 117/4 X |
| 3,425,968 | 2/1969 | Reiling | 260/8 |
| 3,574,153 | 4/1971 | Sirota | 260/80 |
| 3,640,925 | 2/1972 | Touzinsky | 260/17.4 GC |
| 4,098,916 | 7/1978 | Crawford | 427/8 |

*Primary Examiner*—Bernard D. Pianalto
*Attorney, Agent, or Firm*—Brezina & Buckingham

[57] ABSTRACT

An aqueous adhesive composition containing a graft copolymerized product of low amylose starch and acrylamide with rheological and remoistening adhesive properties suitable for coating low basis weight kraft paper on transfer roll coating equipment to make remoistenable sealing tapes. The desired properties of the adhesive composition are obtained by a controlled graft copolymerization together with a simultaneous gelatinization of the starch at temperatures below 210° F. and with the essential addition of cupric or ferric ions before initiating the reaction. The resulting coatable adhesive has a comparatively low viscosity as required for transfer roll coating while retaining the improved adhesion properties of the acrylamide.

16 Claims, No Drawings

ADHESIVE BASED ON A STARCH AND ACRYLAMIDE GRAFT COPOLYMER

RELATED APPLICATIONS

This application is a continuation-in-part of our prior pending application, Ser. No. 103,596, filed Dec. 14, 1979, now abandoned.

BACKGROUND OF THE INVENTION

This invention deals with a remoistenable adhesive composition which is especially suitable on reinforced gummed tapes. Such adhesives should exhibit characteristics of high initial tack and rapid bond formation which are essential for high speed packaging operations, for example, in carrying out automatic or semiautomatic processes. Furthermore, the adhesive composition should exhibit rheological properties which are appropriate for pregumming lightweight kraft via transfer roll coating methods. Pregumming, a step for the application of a remoistenable adhesive to a primary web prior to lamination, is the type of coating preferred by the gummed tape industry. The web strength of a single ply of kraft paper is considerably less than that of a laminated web. Unless the rheology of an adhesive permits it to transfer evenly and uniformly from the coating roll to the web, numerous web breaks are encountered during the pregumming step. Postgumming, a step for the application of the adhesive following lamination, often results in the deposition of a nonuniform coating due to irregularities in the caliper of the laminated, fiberglass-reinforced web with an associated reduction of adhesive properties in certain areas.

In general, the gummed tape industry has chosen animal glue adhesives for use on reinforced sealing tape. Availability, low price and good adhesion properties coupled with ease of compounding and machining have made animal glues the preferred raw material. However, the instability of domestic production and fluctuations in price have made it necessary to look for alternative adhesive compositions.

Low amylose starches, such as those derived from the waxy maize hybrid variety of corn, are commonly used in remoistenable adhesives for nonreinforced kraft paper tape. By themselves, however, gelatinized waxy starches lack the cohesive strength and high initial tack required for a reinforced sealing tape adhesive.

One approach suggested for improving the adhesion properties of waxy, starch-based compositions is through the addition of tack-inducing polymers or copolymers. For example, the U.S. Pat. No. 3,696,065 of Hoffman et al. (1972) describes an admixture of low amylose starch and a copolymer of vinyl acetate and vinyl pyrrolidone. A blend of waxy starch and poly-(vinyl methyl ether-maleic acid monoalkylester) is described in the U.S. Pat. No. 3,988,495, of Lowey and Frommherz (1976). An adhesive composed of polyacrylamide and waxy starch is the subject of the recently issued U.S. Pat. No. 4,105,824, of Monte (1978).

While such polymers and numerous other tack-increasing compounds do impart improvements to the starch-based compositions, admixes of the type described in the above-noted patents have not gained wide acceptance for use on reinforced tapes because of their inability to match the adhesion characteristics of animal glues at viscosities suitable for transfer roll coating. The composition of polymer/copolymer in the adhesives is usually strictly limited due to solubility, viscosity and other rheological requirements. High proportions of added polymer can dramatically and unfavorably increase the viscosities of these adhesive compositions, necessitating a reduction in solids in order to maintain machinable viscosities, e.g. when spreading and leveling from transfer rolls. The slower operating speeds and the higher oven temperatures required to dry such low solids adhesives result in substantially higher costs.

The molecular weight of polymer which can be used in the aforementioned admixtures is also limited if the adhesive is to be applied via transfer roll coating methods. Transfer roll coating is a general term for coating methods that apply a predetermined or pre-metered amount of adhesive from a coating roll onto the surface of a web. Those skilled in the art of paper coating recognize that there are many variations of the above-described roll application of adhesives, but that all are based upon similar principles. Reverse roll, gravure, kiss roll, and offset coaters are four commonly used transfer roll coaters. One generally avoids the use of adhesives in the form of high molecular weight, viscoelastic, cohesive admixture because, at best, they are extremely difficult to apply from transfer roll coaters.

Starches which have been chemically modified in the granular state are commercially available. The elaborate procedures required in these reactions and the expensive spray drying employed usually demand high prices for these modified products. On the other hand, disadvantages are encountered in reacting ungelatinized starch molecules with other additives, including a low degree of conversion in the reaction and an alteration of the starch gel and its resulting rheological properties.

Because starch must be gelatinized by the gummed tape producer prior to the application of any starch-based coating to a substrate, it would be most convenient for the converter to simultaneously carry out the gelatinization process with a graft of vinyl monomers to the starch via free radical initiation of the graft copolymerization reaction. For this type of combined reaction to be feasible in a batch process on a production basis, the following requirements must be met:

1. Reaction time should be short.
2. Reaction must be able to proceed at high solids.
3. The reaction mechanism must favor grafting, keeping the homopolymerization of the vinyl monomer to a minimum.
4. The product must be substantially free from unreacted monomer when it leaves the cooking vessel.
5. The product must be stable with holding time.

It is obvious that the reaction must also be reproducible and yield products which have the desired adhesion and rheological characteristics.

With modern coating equipment, the application of 20 pounds per 3000 ft.$^2$ of adhesive on a 72″ width web at a rate of 800 feet per minute is within the normal scope of operating conditions. Unless cooking vessels of substantial capacity are used, the reaction time must be short enough to meet production demands. In the event a batch goes awry and cannot be used in production, a rapid reaction also reduces the recovery time.

The reaction must be able to proceed at a minimum of 40% and preferably at least 45% by weight of solids, with reference to water as the liquid carrier, if the tape manufacturer is to economically coat the freshly prepared adhesive composition. While many polymer reactions run well in very dilute solutions, the same is not true where the reaction liquid has a high solids content.

The free movement of molecules in the reaction may be hindered in the presence of a high proportion of solids, thereby resulting in the formation of undesirable by-products such as homopolymers.

The mechanism or conditions of the reaction must favor graft copolymerization if the adhesive composition is to be applied via transfer roll coating methods. However, ethylenically unsaturated compounds are extremely unstable to free radical initiation, polymerizing in the presence of free radicals by a chain reaction mechanism such that at any given time only the monomer and its high molecular weight polymer exist in the reaction solution. The in situ homopolymerization of a vinyl monomer produces the same adverse effects on the rheological properties of a coating as does the addition of a high molecular weight polymer to starch as previously noted. The homopolymer cannot be economically separated from the starch-based adhesive composition, and excessive homopolymerization renders the entire batch unusable due to the poor viscoelastic behavior of the product. It is also desirable that complete reaction of the monomer take place during the cooking procedure. Federal regulations severely limit the amounts of free monomers which are permissible in adhesives which may come into contact with foods. The toxicity of many vinyl monomers is recognized, and the exposure of workers to this hazard is minimized by ensuring a complete reaction of monomers before leaving the cooking vessel.

The copolymer composition should also be stable over an extended holding time. In the event that a coating line goes down, it is important for the adhesive to retain its optimum adhesive properties over a 6- to 8-hour holding period.

The U.S. Pat. No. 3,770,672, of Yoshizawa et al. (1973) describes a process for producing an adhesive composition containing a copolymer of enzymatically decomposed starch and vinyl monomers. The initial step in this earlier disclosed process is the decomposition of the starch via alpha-amylose. Vinyl monomers are then copolymerized with the enzymatically reduced starch molecules. Batch cycle time for the described process ranges from 3 to 10 hours. Viscosities of the compositions produced in accordance with this patent vary from 6,000 to 12,000 cps as measured by a rotary viscometer at 10 r.p.m. and 55° C. Such compositions can be applied to kraft webs by extrusion coating methods, but their high viscosities make them unsuitable for transfer roll coating applications.

The U.S. Pat. No. 3,640,925, of Touzinsky et al. (1972) discloses processes for simultaneously gelatinizing starch and grafting ethylenically unsaturated monomers to the starch. The patentees claim success in a free radical initiated grafting reaction with a large number of polymerizable monomers. It is further claimed that the graft copolymerization can be carried out with starch slurries having a solids content of up to 43% by weight, the preferred starch solids content being about 1 to 35% by weight. It has been found in making the present invention, however, that in compositions containing over 40% total solids, e.g. about 45–55% by weight as the solids range most frequently required for adhesive compositions used by gummed tape manufactures, a homopolymerization of the ethylenically unsaturated monomers strongly competes with the grafting reaction and causes an undesirably high viscosity in the final product. This problem has not been previously noted and there is no readily predictable solution for this kind of problem.

SUMMARY OF THE INVENTION

It has now been discovered that the production of reinforced sealing tapes is greatly enhanced by employing an aqueous adhesive composition composed of water as a liquid carrier and a graft copolymer of a low amylose starch and acrylamide as the essential adhesive component, this composition being characterized by a high solids content of about 45–60% by weight, with reference to the water, and also by properties of high initial tack and rapid bond formation together with rheological properties permitting the aqueous composition to be applied by transfer roll coating methods to form a remoistenable adhesive coating on the tape surface, i.e. after evaporation of water from the coating. Surprisingly, this coatable aqueous composition is obtained only by a specific reaction of simultaneously gelatinizing the starch and graft polymerizing the acrylamide thereto as a suspension in the water at said high solids content of 45–60%, preferably 50–55%, and in the presence of catalytic amounts of a free radical initiator and at least one water-soluble metal salt which must be a cupric salt or a ferric salt, the reaction being carried out at an elevated temperature, preferably below the boiling temperature of the water, e.g. about 190–210° F., and for a period of time sufficient to yield a viscosity of the required coatable adhesive composition of less than 1,000 cps, preferably below 750 cps, and especially below about 500 cps, measured on a Brookfield viscometer at 190° F. using a #2 spindle at 20 rpm. Other conventional additives may be incorporated into the adhesive composition, and it is especially desirable upon completion of the simultaneous gelatinizing and graft polymerizing reaction to add a basic compound in order to adjust the pH to a value between about 4.5 and 7, thereby improving the stability of the coatable adhesive. Reinforced seaing tapes with a remoistenable adhesive coating according to the invention are of the highest quality.

DETAILED DESCRIPTION OF THE INVENTION

It is essential for purposes of the present invention to carry out the simultaneous gelatinization of the starch and the graft copolymerization of acrylamide onto the starch in such a manner as to substantially avoid any homopolymerization of the acrylamide monomer. This has been accomplished by introducing small catalytic amounts of two specific metal ions, namely cupric and/or ferric ions, into the aqueous dispersion of the starch and monomer prior to the introduction of the free radical initiator. The amount of the added cupric or ferric ions in the form of their water-soluble salts is preferably about 0.01 to 0.5% by weight with reference to the suspended starch. These small amounts of the salts may be added together with the acrylamide or separately in aqueous solution before the reaction is initiated.

The reaction itself is preferably carried out as a batch process in a suitable cooking vessel having mixing and heating means, preferably using steam injection to quickly reach the desired reaction temperature of approximately 200° F.±10° F. The free radical initiator is introduced just before heating the reaction mixture, again using catalytic amounts on the order of 0.1 to 2% by weight with reference to the starch. The total heating time is relatively short, e.g. up to about 30 minutes and preferably on the order of about 10 to 20 minutes. By carefully observing these reaction conditions, i.e. working within the narrow limits of the present invention, it is possible to achieve the low viscosities demanded by transfer roll coating methods while still assuring a substantially complete grafting of the acrylamide onto the starch.

Acrylamide is a readily available commercial monomer and is used in amounts of about 10 to 50% by weight with reference to the starch in order to achieve the desired adhesion properties in the coating composition. Such large concentrations of this readily polymerizable monomer tend to favor homopolymerization but surprisingly this effect is substantially repressed by the present invention so as to avoid the problems caused by the presence of polyacrylamide in the coatable adhesive. In spite of the relatively low reaction temperature and short reaction times of the present invention, the acrylamide monomer is completely reacted and fully grafted onto the long-chain starch molecules.

The preferred starches for this composition are derived from waxy maize corn. The starches are high in amylopectin and low in amylose. Starches which contain less than 10% amylose from other sources are also acceptable. Commercially available products which find use in this composition are: "Amaizo" (American Maize Products Company); "Hi-Fi" (Anhaeuser-Busch, Inc.); "Tapon" (National Starch and Chemical Corporation); and "Gum Tac" (Corn Products Corporation).

The preferred initiators for the graft copolymerization are efficient, free radical forming compounds. Inorganic persulfate and organic peroxide compounds can be used alone or can be coupled with reducing agents such as sulfite, thiosulfate, bisulfite, or metabisulfite ions as suitable free radical initiators.

Anticurling agents are conventionally used in prior water-remoistenable adhesives. They serve to increase the dimensional stability of the coated web. Such agents include sodium nitrate, calcium nitrate, urea, sorbitol and invert syrups. Anticurling agents can be added to the composition preferably in amounts of 10 to 30% based on the weight of the starch.

At the completion of the reaction, the pH of the graft copolymer solution is the range of 2.0–3.0 when measured at 190° F. In order to prevent acid thinning of the starch-based composition with extended holding time, it is necessary to increase the pH by the addition of basic salts. For maximum stability and solubility, the pH of the adhesive composition should be adjusted to a range of 4.5–7.0 at 190° F. Basic salts which find use in this composition include sodium hydroxide, potassium hydroxide, monobasic sodium phosphate, dibasic sodium phosphate, tribasic sodium phosphate, sodium carbonate, sodium dicarbonate and buffers formed with the sodium and potassium salts of boric acid, citric acid, tartaric acid, formic acid, and acetic acid. Addition rates are based on neutraliziing the peroxide and raising the pH of the admix to 4.5–7.

Further understanding of this invention can be obtained from the following examples:

EXAMPLE 1

The adhesive composition was prepared in a reaction vessel equipped with an agitator and heated by live steam injection. The system was agitated throughout the entire reaction. To 1550 parts by weight of water was added 200 parts by weight sodium nitrate. 1000 parts by weight waxy maixe starch was then introduced into the slurry. One part by weight of copper sulfate and 300 parts by weight of acrylamide were added to the dispersion, 0.165% ammonium persulfate by weight of starch and 0.105% sodium metabisulfite by weight of starch were then added to the slurry. Immediately following the addition of the free radical initiators, the steam was turned on and the solution was rapidly heated to 200° F. in order to simultaneously gelatinize the starch and form the graft copolymer. After holding the composition for 15 minutes at 200° F., sufficient sodium tartrate was added to adjust the pH to 5.5±0.5. The buffered adhesive was then dropped into a jacketed holding tank and from there it was pumped to the coating equipment. The viscosity of the adhesive at 47% solids was 320 cps as measured by a Brookfield viscometer, #2 spindle, 20 rpm at 190° F. The graft copolymer composition was applied to unbleached sulfate kraft (30 lbs./3000 ft.$^2$ basis weight) by a transfer roll coater. The coated amount was 16 lbs/3000 ft.$^2$ by dry weight.

The adhesive properties of the gummed tape were evaluated with a Fipago tack tester. The test conditions were as follows:

Ambient temperature: 72° F. Relative humidity: 50% Water application: 12 lbs. per 3000 ft.$^2$. Test strips: 9 in.×3 in.

TABLE 1

| Adhesive strength (mmKp) vs. open time (sec.) at 0 closed time. | | | | |
|---|---|---|---|---|
| Open time | 2 | 5 | 15 | 25 |
| Tape of this invention | 55 | 90+ | 90+ | 90+ |
| Commercial tape with animal glue adhesive | 45 | 80 | 85 | 40 |

TABLE 2

| Adhesive strength (mmKp) vs. closed time (sec.) at 2-seconds open time. | | | | |
|---|---|---|---|---|
| Closed Time | 0 | 0.5 | 1 | 2 |
| Tape of this invention | 55 | 78 | 90+ | 90+ |
| Commercial tape with animal glue adhesive | 45 | 60 | 80 | 90+ |

EXAMPLE 2

Under the same reaction conditions as in Example 1, an aqueous dispersion was prepared containing, by weight, 1000 parts starch, 200 parts sodium nitrate, 200 parts acrylamide, 2 parts ferric chloride and 1350 parts water. To the above slurry was added 6 parts by weight ammonium persulfate and the solution was then rapidly brought to 200° F. The adhesive composition was held for 15 minutes at 200° F. and then the pH was adjusted to 6.0±0.5 by the addition of caustic soda. The solution had a viscosity of 380 cps at 50% solids as measured by a Brookfield viscometer, #2 spindle, 20 rpm at 190° F. The adhesion properties of the final product made it suitable for use on reinforced sealing tape.

EXAMPLE 3

Following the same procedures and reaction conditions as used in Example 1, an aqueous dispersion was prepared containing by weight 1000 parts starch, 200 parts sodium nitrate, 250 parts acrylamide, 0.2 parts copper sulfate, and 1525 parts water. To the resulting slurry there was added 1.65 parts by weight ammonium persulfate and 1.05 parts by weight sodium metabisulfite. The solution was rapidly heated to 200° F. After holding the composition for 15 minutes at 200° F., the pH was adjusted to 6.5±0.5 by the addition of sodium borate. The resulting adhesive composition had a viscosity of 500 cps at 45% solids as measured by a Brookfield viscometer, #2 spindle, 20 rpm at 190° F. The adhesion properties of the final product made it suitable for use on reinforced sealing tape.

EXAMPLES 4-11

In Examples 4-11, an evaluation was made of the effect that various metal salts and chain transfer agents have on the graft copolymerization of acrylamide and starch. The batches were identical in that all contained aqueous dispersions of 150 pts. starch, 30 parts sodium nitrate, and 45 parts acrylamide, and were initiated by the introduction of 0.2 parts ammonium persulfate and 0.1 parts sodium metabisulfite. Sufficient water was used so that the total solids of all compositions was 45%. The procedure was the same as that employed in Example 1 except that the solutions were heated by conduction rather than steam injection.

TABLE 3

| Examples | Additive | Amounts (Parts) | Viscosity (cps) |
|---|---|---|---|
| 4 | None | — | +4000 |
| 5 | $CuSO_4$—$5H_2O$ | 0.5 | 240 |
| 6 | $FeCl_3$—$6H_2O$ | 0.7 | 280 |
| 7 | $FeSO_4$—$7H_2O$ | 0.7 | 780 |
| 8 | $MnSO_4$—$H_2O$ | 0.7 | 3200 |
| 9 | $Ni(NO_3)_2$—$6H_2O$ | 0.7 | 1320 |
| 10 | p-methoxyphenol | 0.7 | 1050 |
| 11 | Isopropanol | 7 | 1100 |

Viscosities were measured on a Brookfield viscometer #2 spindle, 10 rpm at 190° F.

The examples where the viscosity exceeded 700 cps and especially 1000 cps at 45% solids are those in which a substantial amount of homopolymer was formed in the reaction. The rheological properties of these high viscosity compositions make them unsuitable for transfer roll applications. The reduced viscosity of Example 7 was probably due to the conversion of a portion of the ferrous ions to ferric ions.

EXAMPLES 12-13

To 275 parts water there were added with agitation 150 parts waxy starch, 30 parts sodium nitrate, and 45 parts polyacrylamide. The slurry was rapidly heated to 200° F. and held for 15 minutes prior to testing. The polyacrylamide used in Example 12 was Cyanamer P-26, molecular weight—200,000, manufactured by American Cyanamid. Percol WN-23, molecular weight—7,500,000, made by Allied Colloids, was the polyacrylamide used in Example 13. The viscosities of Example 12 and 13 are compared to the viscosity of the analogous graft copolymer composition of Example 5 in the following table.

TABLE 4

| Example | Additive | Viscosity |
|---|---|---|
| 5 | Graft copolymer | 240 |
| 12 | Cyanamer P-26 | 4000 cps. |
| 13 | Percol WN-23 | 4000 cps. |

Viscosities were measured on a Brookfield viscometer, #2 spindle, 10 rpm at 190° F.

Provided that homopolymerization is avoided and viscosities are maintained within the low limits required by the present invention, the starch/acrylamide graft copolymer can be coated directly onto a sealing tape surface by transfer roller coating directly from the batch reacted aqueous mixture without any separation of unreacted monomer, polymer byproducts or the like. Pregumming of a single ply paper tape is preferred in the preparation of a laminated reinforced sealing tape, but in any case, the coating adhesive applies well with good spreading and leveling properties. After the water is evaporated, the remoistenable adhesive coating consists essentially of the graft copolymer together with any other solid additives.

The combination of excellent rheological and adhesive properties in the adhesive composition of this invention are believed to be the result of preventing homopolymerization of the acrylamide due to the presence of the cupric and/or ferric ions. It is theorized that in the grafting reaction the metal ions form complexes at the hydroxyl groups on the starch molecule. The resulting hydroxy/metal ion complexes are then the sites at which free radicals are preferentially produced so as to favorably direct a graft polymerization over a homopolymerization of the acrylamide monomer.

In addition to their complex forming ability, the cupric and ferric ions are also effective chain transfer agents for the polymerization of acrylamide. Therefore, even if some homopolymerization occurs, these metal ions help to regulate the molecular weight of the polyacrylamide. Thus, rather than acting as coinitiators as in the oxidation-reduction free radical initiator systems of Touzinsky et al., the metal salts of the present invention actually inhibit homopolymerization and perform a distinctly different function in the suspension polymerization carried out with a high solids content.

The present invention provides a much more economical and effective means of producing remoistenable sealing tapes, especially laminated or reinforced sealing tapes where low weight, strength and uniformity are essential together with high initial tack and rapid bond formation after moistening.

The invention is hereby claimed as follows:

1. An aqueous adhesive composition with a high solids content and having rheological properties permitting application by transfer roll coating to a reinforced sealing tape to form a remoistenable adhesive coating thereon, said composition comprising
   (a) water as a liquid carrier; and
   (b) a graft copolymer of a low amylose starch and acrylamide as the essential adhesive, said copolymer being obtained by a reaction simultaneously gelatinizing said starch and graft polymerizing said acrylamide thereto in said water at a solids content of about 45 to 60% by weight and in the presence of catalytic amounts of a free radical initiator and at least one water-soluble metal salt selected from the group consisting of cupric and ferric salts, said reaction being carried out at an elevated temperature and for a period of time sufficient to yield a viscosity of said coatable adhesive composition of less than 1,000 cps, measured on a Brookfield viscometer, #2 spindle at 20 rpm and 190° F.

2. An aqueous adhesive composition as claimed in claim 1 having a solids content of about 45 to 55% by weight.

3. An aqueous adhesive composition as claimed in claim 1 or 2 wherein the viscosity is less than 750 cps.

4. An aqueous adhesive composition as claimed in claim 1 or 2 wherein the viscosity is less than 500 cps.

5. An aqueous adhesive composition as claimed in claim 1 wherein the amount of grafted acrylamide is about 10 to 50% by weight with reference to the starch.

6. An aqueous adhesive composition as claimed in claim 1 or 5 wherein the amount of said water-soluble metal salt is about 0.01 to 0.5% by weight with reference to the starch.

7. An aqueous adhesive composition as claimed in claim 1 wherein a basic compound is added after said reaction to adjust the pH to a value between about 4.5 and 7.

8. An aqueous adhesive composition as claimed in claim 7 wherein said basic compound is selected from the group consisting of: sodium and potassium hydroxide; monobasic, dibasic and tribasic sodium phosphate; sodium carbonate and bicarbonate; and the sodium and potassium salts or boric acid, citric acid, tartaric acid, formic acid and acetic acid.

9. An aqueous adhesive composition as claimed in claim 1 containing as an anticurling agent about 10 to 50% by weight, with reference to the starch, of a substance selected from the group consisting of sodium nitrate, calcium nitrate, urea, sorbitol and invert syrups.

10. A reinforced sealing tape obtained by a transfer roll coating of the aqueous composition claimed in claim 1, 2 or 5 onto the tape surface and subsequently evaporating water from said composition to yield a remoistenable adhesive coating thereon.

11. An aqueous adhesive composition as claimed in claim 1 having a solids content of 50 to 55% by weight.

12. An aqueous adhesive composition as claimed in claim 11 wherein the amount of grafted acrylamide is about 10 to 50% by weight with reference to the starch.

13. A reinforced sealing tape obtained by a transfer roll coating of the aqueous composition claimed in claim 11 or 12 onto the tape surface and subsequently evaporating water from said composition to yield a remoistenable adhesive coating thereon.

14. An aqueous adhesive composition with a high solids content and having rheological properties permitting application by transfer roll coating to a reinforced sealing tape to form a remoistenable adhesive coating thereon, said composition comprising
(a) water as a liquid carrier; and
(b) a graft compolymer of a low amylose starch and acrylamide as the essential adhesive, said copolymer being obtained by a reaction simultaneously gelatinizing said starch and graft polymerizing said acrylamide thereto in said water at a solids content of about 40 to 45% by weight and in the presence of catalytic amounts of a free radical initiator and at least one water-soluble metal salt selected from the group consisting of cupric and ferric salts, said reaction being carried out at an elevated temperature and for a period of time sufficient to yield a viscosity of said coatable adhesive composition of less than 500 cps, measured on a Brookfield viscometer, #2 spindle at 20 rpm and 190° F.

15. An aqueous adhesive composition as claimed in claim 14 wherein the amount of grafted acrylamide is about 10 to 50% by weight with reference to the starch.

16. A reinforced sealing tape obtained by a transfer roll coating of the aqueous composition claimed in claim 14 or 15 onto the tape surface and subsequently evaporating water from said composition to yield a remoistenable adhesive coating thereon.

* * * * *